(12) United States Patent
Nanos et al.

(10) Patent No.: US 6,381,744 B2
(45) Date of Patent: Apr. 30, 2002

(54) AUTOMATED SURVEY KIOSK

(75) Inventors: Nikita J. Nanos, Ottawa; John J. Nanos, Whitby, both of (CA)

(73) Assignee: SES Canada Research Inc., Toronto (CA)

( * ) Notice: Subject to any disclaimer, the term of this patent is extended or adjusted under 35 U.S.C. 154(b) by 0 days.

(21) Appl. No.: 09/225,561

(22) Filed: Jan. 5, 1999

(30) Foreign Application Priority Data

Jan. 6, 1998  (CA) .............................................. 2223597

(51) Int. Cl.$^7$ .............................................. H04N 7/173
(52) U.S. Cl. .......................................... 725/24; 705/27
(58) Field of Search .................................. 345/327, 328; 455/4.2; 348/6, 7, 12, 13, 552; 705/26, 27; 725/24, 23

(56) References Cited

U.S. PATENT DOCUMENTS

| | | | |
|---|---|---|---|
| 4,355,372 A | 10/1982 | Johnson et al. | ............. 364/900 |
| 4,958,284 A | 9/1990 | Bishop et al. | ............... 364/419 |
| 5,198,642 A | 3/1993 | Deniger | ...................... 235/375 |

(List continued on next page.)

FOREIGN PATENT DOCUMENTS

WO         9735441         9/1997

OTHER PUBLICATIONS

Pitkow J et al "Results from the First World–Wide Web user survey", Computer Networks and ISDN Systems, vol. 27, No. 2, Nov. 1, 1994 (Nov. 01, 1994), p. 243–254.
Swoboda W J et al "Internet Surveys by Direct Mailing : an Innovative Way of Collecting Data", Social Science Computer Review, vol. 15, No. 3, 1997, pp. 242–255.

*Primary Examiner*—Victor R. Kostak
(74) *Attorney, Agent, or Firm*—Merchant & Gould P.C.

(57) ABSTRACT

An automated survey kiosk which is easy to install at a location, does not require access to standard telephone lines, can be easily reprogrammed, has unlimited language capabilities, which permits open-ended answers to inquiries or questions and whose survey responses can be sent directly to a client. The automated survey kiosk for administering a survey includes a touch screen for displaying the survey and for receiving survey responses, the touch screen being operatively connected to a general purpose computer for storing the survey, the general computer including a memory for storing the survey responses, operatively connected to the touch screen; and a wireless modem for transmitting the survey responses at a remote location at predetermined intervals. The automated survey kiosk is programmed to prompt a user for a desired language and then administer the survey in the chosen language. The automated survey kiosk may be remotely reprogrammed with new questions, by altering existing questions or by deleting existing questions, from the location of the research firm, even while a respondent is answering the survey. The survey responses may be transmitted to the research firm, or may be directly sent to the client, who must be equipped with the proper equipment to communicate with the automated survey kiosk. Accordingly, the client can have almost instantaneous access to the latest survey data, and can modify the survey during the survey period. The kiosk is also provided with a microphone in order to permit a respondent to record a verbal answer should the multiple choices offered not adequately described the respondent's answer.

8 Claims, 8 Drawing Sheets

U.S. PATENT DOCUMENTS

| | | | |
|---|---|---|---|
| 5,237,157 A | | 8/1993 | Kaplan ........................ 235/375 |
| 5,355,327 A | | 10/1994 | Stent et al. ............ 364/551.01 |
| 5,361,200 A | | 11/1994 | Weybright et al. .......... 364/401 |
| 5,513,117 A | * | 4/1996 | Small ......................... 364/479 |
| 5,535,118 A | | 7/1996 | Chumbley .............. 364/401 R |
| 5,594,471 A | | 1/1997 | Deeran ....................... 345/173 |
| 5,765,142 A | * | 6/1998 | Allred et al. ................. 705/26 |
| 5,867,821 A | * | 2/1999 | Ballantyne et al. ............ 705/2 |
| 5,930,810 A | * | 7/1999 | Farros et al. ............... 707/506 |
| 5,954,690 A | * | 9/1999 | Szabo ........................ 600/300 |
| 5,983,200 A | * | 11/1999 | Slotznick ..................... 705/26 |
| 6,016,476 A | * | 1/2000 | Maes et al. .................... 705/1 |
| 6,020,883 A | * | 2/2000 | Herz et al. ................... 345/327 |
| 6,024,641 A | * | 2/2000 | Sarno .......................... 463/17 |
| 6,026,387 A | * | 2/2000 | Kesel .......................... 706/52 |
| 6,061,646 A | * | 5/2000 | Martino et al. ................ 704/3 |
| 6,092,080 A | * | 7/2000 | Gustman .................... 707/103 |
| 6,154,214 A | * | 11/2000 | Uyehara et al. ............ 345/358 |

\* cited by examiner

INFORMATION FLOW

SELECT A LANGUAGE

- ⟨X⟩ Continue in English
- ⟨X⟩ Continua en Español
- ⟨X⟩ Continuez en Français
- ⟨X⟩ Auf Deutsch fortgahzen
- ⟨X⟩ Συνεχηζεται σε Ελληνικα
- ⟨X⟩ Le-hamshich b'ıvreet
- ⟨X⟩ Continui in Italiano

120

PLEASE USE THE KEYBOARD
TO ENTER YOUR POSTAL CODE.

A1B 2C3

| 1 | 2 | 3 | 4 | 5 | 6 | 7 | 8 | 9 | 0 |
|---|---|---|---|---|---|---|---|---|---|
| A | B | C | D | E | F | G | H | I | J |
| K | L | M | N | O | P | Q | R | S | T |
| U | V | W | X | Y | Z | BACKSPACE || DONE ||

120

AUTOMATED SURVEY KIOSK

FIELD OF THE INVENTION

The present invention relates to the field of market research and data collection systems and devices.

DESCRIPTION OF THE PRIOR ART

For the past fifty years, the market research industry has seen a gradual refinement of traditional data gathering techniques and methodologies. Likewise, there has been a corresponding evolution and increased sophistication in the use of market and customer data by decision makers to test products, profile customers and identify new market opportunities.

Technological advancements have helped close the loop between head office decision makers and their front line operations. In the past, inventory and sales reports took days or even weeks to reach head office. Now, new technologies have increased accessibility and shortened the "data lag" from weeks to hours. Examples of these technology-driven advancements can be found in almost all parts of the business organization ranging from financial control, hourly sales reports through to instantaneous inventory tracking.

One area where business has not seen a commensurate "technology shock" is market research. Traditionally, people are surveyed obtain data that is then analysed for various purposes, such as market research, demographic data and other types of statistics.

Typically, a client wishing to obtain certain data will approach a research firm to undertake the survey, compile the data and provide a paper report of the results.

The most common method of obtaining such data is to supply employees of the research firm with questionnaires who personally, or by telephone, interview others, hereinafter referred to as "respondents", to obtain the answers to the questions. The questionnaires are then sent back to the research firm, compiled and a resulting report is transmitted to the client.

This method has the disadvantage of being labour intensive and not providing results quickly enough. Typically, depending on the survey sample, i.e. the number of people sampled, and the number of questions, the turnaround time for the information is a minimum of four to five days. This involves time to code the survey, time to input the data, time to generate tabulations and to generate the paper report. Transit time must also be included in such a process. Furthermore, for on-site, in person interviews, graphic image prompting is limited in that it is awkward to present a respondent with one or more graphic images, and even more so when feedback is requested on a flyer or brochure. Language capability is also limited in the sense that should more than one language be required to perform the survey, each employee must be provided with an edition of the questionnaire in each language, and should preferably be at least conversant in all of the languages.

Reliance on telephone and in person interviewing naturally results in a structural time lag between collecting field data and conveying survey results to decision makers. Fifty years ago an overwhelming majority of research was based on telephone or inperson interviews. The same still holds true today.

In an era where business information is increasingly commoditized, the market research industry has embraced technology primarily to refine and not to revolutionize. For example, predictive dialling (where computers screen outbound calls for live pick-up) has increased the efficiency of telephone banks. However, alternatives to traditional telephone and in-person data collection have not taken root in the market research industry.

The result is a situation where decision makers can have instantaneous and real-time access to information across their whole operation, except for market research.

It is only within the last ten years or so that a nascent attempt to explore alternative automated data-gathering techniques emerged. The following is a brief review of the relevant prior art.

U.S. Pat. No. 4,345,345 to Cadotte et al. discloses an electronic terminal for collecting opinion data from customers of an organization as to the satisfaction with the services rendered. The terminal includes a keyboard that displays inquiries to a respondent with multiple-choice responses for each inquiry. Each response is associated with a key, so that the respondent presses the appropriate key in connection with the appropriate response. Each response is electronically recorded by a microprocessor controller, and the selection is visually displayed for the respondent. The responses are permanently recorded by the controller for subsequent analysis. Similar devices are disclosed in U.S. Pat. Nos. RE 31,951 (Johnson et al.) and 5,091,877 (Itoh et al.) These devices are specifically designed to collect data electronically and transmit this data to a central memory.

A disadvantage of these devices is that they require specific programming in order to correlate the responses with the inquiries or questions. Each time the questions to a survey are modified, or a new survey created, these devices need to be reprogrammmed, which is time consuming, costly and requires the intervention of a person having expertise in programming such devices. Further, the devices mentioned above require the respondent to input the responses using the keyboard, which requires the respondent to have a substantial level of comfort with using a keyboard.

Another drawback with present surveying techniques is that the average respondent is reluctant to devote any of his or her time to complete a survey, whether by interview, completing a form or using electronic devices of the type mentioned above. In fact, many people consider it a nuisance when approached by a person conducting a survey. This is primarily due to the fact that would-be respondents fail to realize any personal gain from the otherwise time-consuming interruption of their lives. In light of this, it is believed that people would be more willing and accepting to be surveyed if there were some sort of incentive to entice the would-be respondent.

Shortfalls in the first round of automated data gathering devices resulted in two types of alternative devices being developed. The first group of alternatives, such as those described in U.S. Pat. Nos 5,361,200 (Webright et al.) and 4,355,372 (Johnson et al.) use keypads to collect real-time data. Keypad-based devices suffer from drawbacks ranging from limited language selection, incapacity to dispense coupons/incentives as well as the inability to accept open-ended responses. These devices therefore lack the flexibility required to accurately conduct on-site research in a retail setting.

The second type of alternative devices were developed for on-site research in a retail setting. Specific alternative devices include U.S. Pat. Nos 5,535,118 (Chumbley) and 5,237,157 (Kaplan). These devices, instead of relying on a keyboard or keypad for inputting a response, use a response card/punch card system. Even quasi-research devices such as the '157 patent targeted to the music industry, collect demographic information by means of a paper-based membership application which asks for this information.

For these devices which utilize paper, respondents receive a response/punch card with questions, mark their responses on the card and insert it into the device which optically scans or reads the responses. The '118 device, for example, then dispenses a coupon as an incentive after the response/punch card is inserted into the device.

These devices have not been accepted by the mainstream market research community because of a number of serious methodological problems and lack of flexibility which undermine the accuracy and integrity of the research data.

It is generally recognized in the market research community that a central cause of bias in survey results is the order in which the questions are asked. For example, if one were asking questions on two products X and Y, to avoid bias one should alternate the order so that one begins product X questions fifty percent of the time and product Y questions fifty percent of the time. The research industry commonly refers to this alternative order approach as "skip rotations". Beginning with the same variable all of the time introduces a definite bias in the survey results.

Any type of device that relies on response/punch cards cannot, by any definition, properly administer a skip rotation. Likewise, it cannot ensure that the respondent answers the questions in proper order. The respondent may even skip critical questions. Respondents have the discretion regarding the order in which they fill out the questionnaire and which questions they decide to answer. This serious methodological flaw effectively discounts these devices as accurate and statistically valid opinion measurers.

Another serious methodological flaw involves the language bias of these devices. The past ten years has seen a tremendous surge in the importance of ethnic marketing. Multi-cultural markets across North America have been relatively untapped by the research industry. Finding interviewers to administer telephone or in-person questionnaires who are fluently multi-lingual is very difficult and prohibitively costly. The devices cited above have not been able to overcome this obstacle.

The response/punch card system cannot effectively prompt the questions in multiple languages because the device is limited by the space on the cards. For multicultural markets and settings, respondent participation will be skewed to the language on the punch card. Even if only ten percent of a target population is outside of the language on the punch-card, this would effectively bias the sample results due to non-participation of a portion of the sample. Since everyone in the target sample could not participate, confidence intervals that measure the accuracy of the survey should not be conducted due to sample bias.

Another key factor that influences the accuracy of survey results is the potential answers respondents are prompted to select from. All of the devices cited whether relying on response/punch card or keypad systems include fixed, pre-programmed responses that offer no opportunity for a response outside of the pre-determined list. For telephone or in-person interviews these responses would fall under "other" responses where respondents could provide an answer outside of the pre-determined set. None of the devices allow for open-ended questions, where a respondent can provide a special answer in their own words. Being limited to fixed answers also limits the flexibility of the research process by eliminating the use of open-ended questions. More importantly it introduces bias by forcing respondents to select from a pre-set list, because responses outside of the pre-set list cannot be recorded. The result is survey data that does not accurately reflect the full range of respondent opinion.

Measuring the impact of advertising and marketing is a critical success factor for organizations. Using traditional market research techniques, one cannot prompt images over the telephone. Likewise, as mentioned above, introducing a series of graphics (i.e. newspaper or TV ads) can be cumbersome during an in-person interview for many retail settings. In the worst case scenario, graphics might not be introduced properly or in the right order thus leading to significant bias and error in the survey results. The devices cited cannot prompt a graphic image of a newspaper, flyer or full-motion television advertisement. Market research studies have demonstrated that the most effective means of measuring awareness is to prompt the respondent with the actual graphic image.

Concerning incentives, although the Chumbley device can issue a coupon, the coupon is dispensed regardless of the number of questions that have actually been answered. Respondents could theoretically therefore fill out two questions of a 12 question questionnaire, insert the punch card and receive the coupon. These devices, therefore, at a cost to the operator, issue incentive rewards for partial completions. None of the devices cited conduct any sort of check to ensure that the whole survey was properly completed before an incentive coupon is issued.

As a result of these serious methodological and logistical problems, none of the devices can accurately collect and measure public opinion from a statistical viewpoint. Although the overall concept of automated data collection remains sound, as a result of their weaknesses, none of the devices have been accepted by the mainstream market research industry.

The devices developed to date can at best be described as technology solutions that have been applied to the market research process. The correct solution should be driven by methodological considerations, not technology.

SUMMARY OF THE INVENTION

It is thus an object of the invention to provide an automated survey kiosk which is easy to install at a location, does not necessarily require access to standard telephone lines, can be easily reprogrammed, has unlimited language capabilities and whose the data can be sent directly to a client.

In accordance with the invention, this object is achieved with an automated survey kiosk for administering a survey, the survey including a plurality of inquiries, the kiosk comprising:

a central processing unit including memory means for storing said survey and for controlling the administration of the survey;

means for sequentially displaying each inquiry in the survey;

means for receiving survey responses;

means for storing the survey responses operatively connected to the means for receiving survey responses; and means for transmitting the survey responses to a remote location at predetermined intervals;

whereby, in use, said central processing unit displays each inquiry sequentially on said means for displaying each inquiry and prompts a respondent to answer each inquiry by selecting a response from a plurality of responses through said means for receiving the survey responses, said survey responses being stored in said means for storing said survey responses for subsequent transmission to said remote location.

The automated survey kiosk is programmed to prompt a user for a desired language and then administer the survey in the chosen language. Furthermore, the automated survey kiosk may be remotely reprogrammed with new questions, or by deleting existing questions. The survey responses may be transmitted to the search firm, or may be directly sent to the client, who must be equipped with the proper equipment to communicate with the automated survey kiosk.

It is a further object of the invention to provide an automated survey kiosk which can accept open-ended answers. In accordance with the invention, this object is achieved with a survey kiosk of the type mentioned above, where at least one inquiry includes a choice for indicating that the respondent wishes to answer an inquiry verbally, and where the kiosk further includes a microphone and means for recording the answer.

BRIEF DESCRIPTION OF THE DRAWINGS

The present invention and its advantages will be more easily understood after reading the following non-restrictive description of preferred embodiments thereof, made with reference to the following drawings in which.

DESCRIPTION OF A PREFERRED EMBODIMENT OF THE INVENTION

Figure 1A:
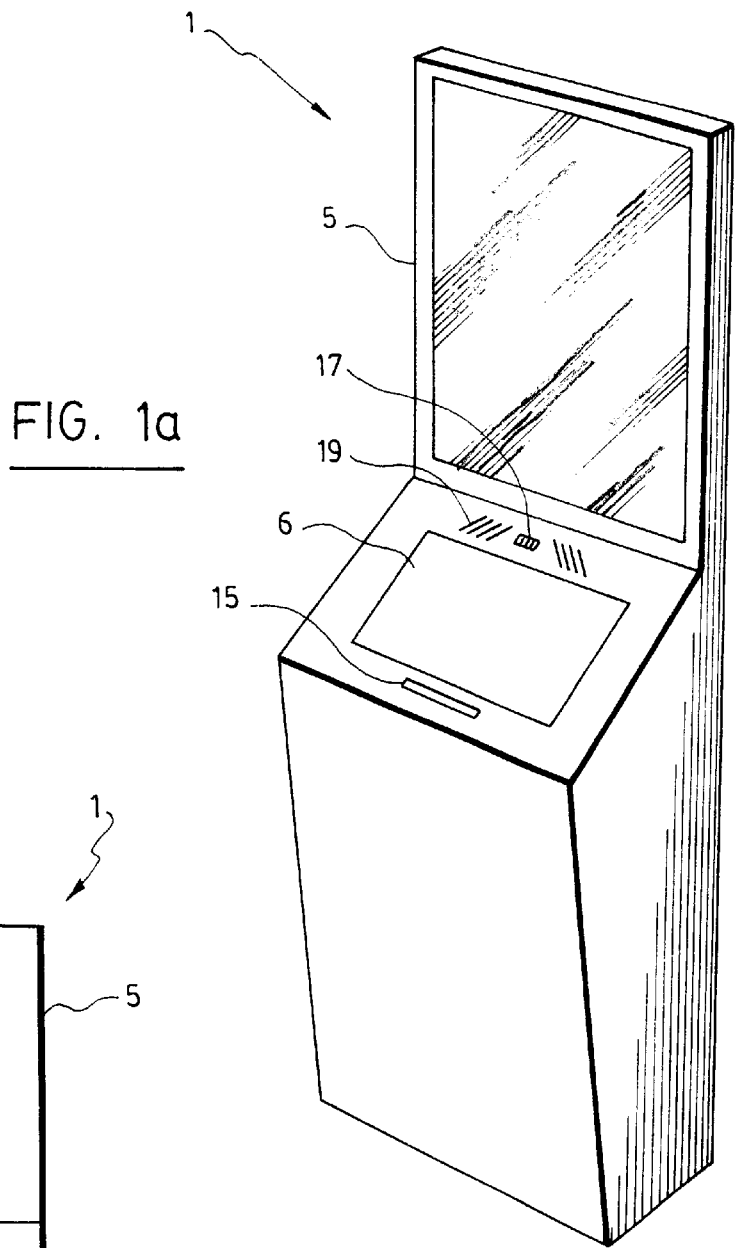
FIGS. 1(a) and 1(b) are respectively front perspective and back views of an automated survey kiosk according to a preferred embodiment of the invention.
Figure 1B:
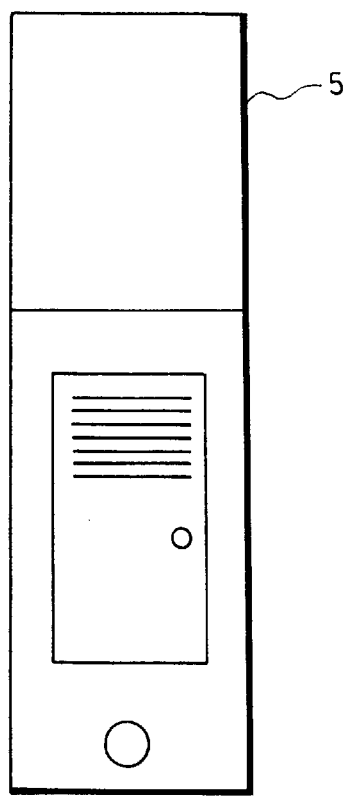
Figure 2:
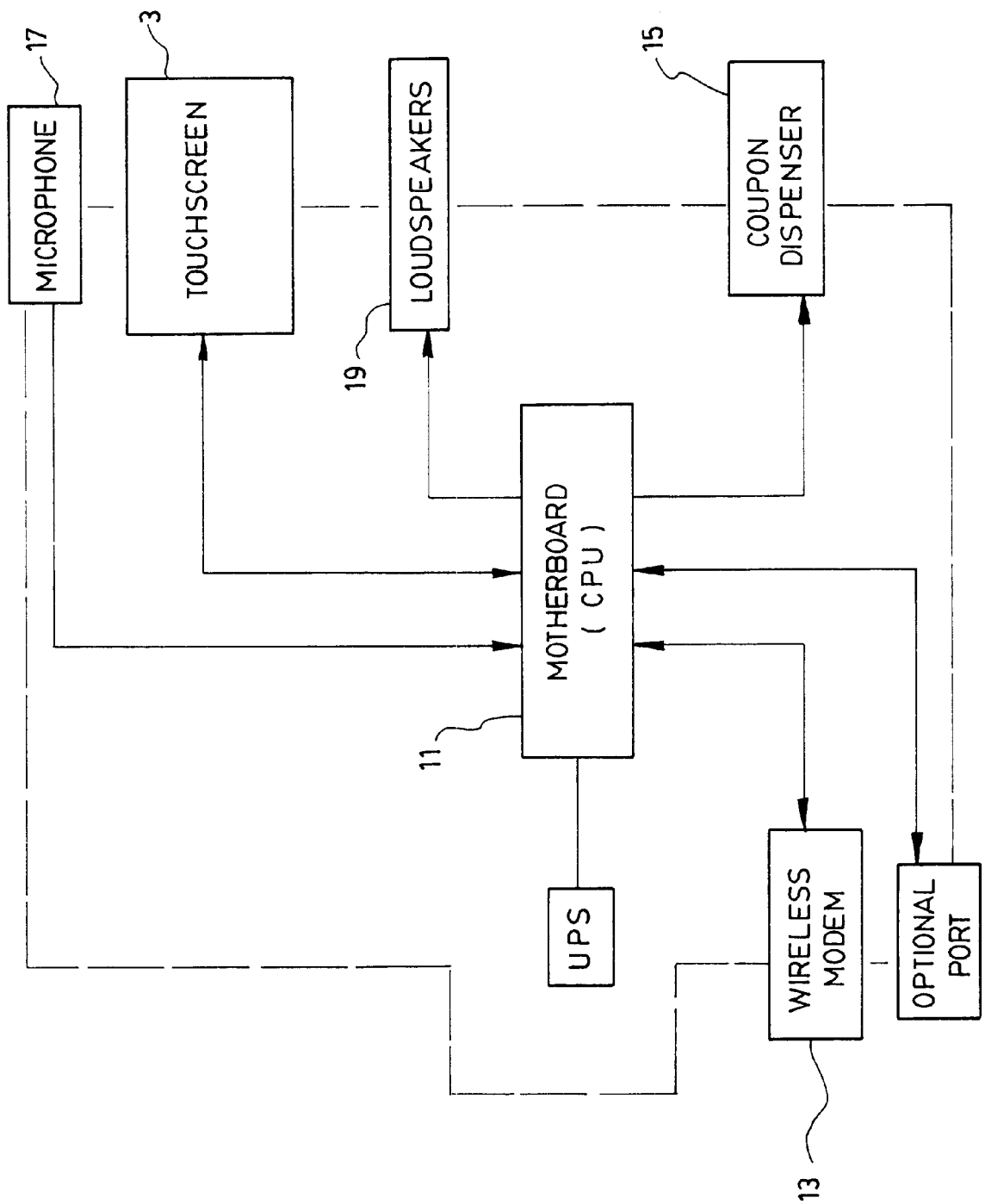
FIG. 2 is a schematic representation of the components of the kiosk of FIG. 1.

FIG. 1 shows an automated survey kiosk 1 according to the preferred embodiment of the invention, including a housing 5 having a base, front and side panels as well as a back access panel. Two locations to attach customized signage to the device are provided for users to attach customized signage. First, affixed to the front panel of the unit is an area for customized signage which includes a plexi-glass envelope. Second, attached to the top of the kiosk is a removable customized housing for signs. This customized removal sign housing is attached to the main unit by means of two gyro locks on the sides of the main unit. Signs are slid into a plexi-glass envelope and then inserted into the sign housing through a slot at the top. The back access panel includes a lock and a series of ventilation slits to facilitate the internal circulation of air. Beneath the back access panel is an opening for a retractable power cord that supplies electricity to the device. These features are not shown on the drawings since they are within the skill of one versed in the art, and form no part of the invention.

The kiosk 1 includes means for displaying a survey 3, means for receiving survey responses, a central processing unit 11, a modem 13, and preferably further includes a coupon dispenser 15, a microphone 17 and loudspeakers located within the housing 5 of the kiosk 1.

It should be understood that the central processing unit 11 may take the form of a general purpose personal computer with the usual components. The central processing unit includes means for storing a survey, such as memory means and a hard disk drive.

A typical survey to be administered will include a plurality of inquiries to be answered by a respondent. Generally, the kiosk of the invention will display each inquiry sequentially on the means for displaying the survey 3 and will prompt a respondent to answer each inquiry. The respondent enters the responses through the means for receiving survey responses, which are then stored in the means for storing the survey responses, as will be hereinafter detailed.

The means for displaying the survey 3 preferably are a touch screen monitor to collect information surrounded by a bezel frame. The touch screen monitor is comprised of 100,000 touch points per square inch. It typically requires a finger or gloved hand pressure activation of between 3 to 4 ounces (55 to 85 grams). Within five to ten milliseconds the touch activation or respondent selection is recorded by the device. The top layer of the touch screen monitor has a polyester hard surface coating with a non-glare finish.

Surrounding the monitor is a mounting bezel frame 6 (see FIG. 1). This bezel frame also helps facilitate the insertion and withdrawal of the touch screen monitor for easy maintenance and replacement. A monitor that meets the device specifications that may be used is a 17 inch resistive touch screen manufactured by KDS Pixel Touch.

The touch screen monitor is operatively connected to the central processing unit (CPU) which has the capability to run full motion video for the respondent to view. As mentioned above, the CPU can take the form of a general purpose personal computer, the requirements of which could be a Pentium 200 MHZ MMX microprocessor with 32 meg RAM, a 4.3 gigabyte hard drive and a 32 speed CD-ROM.

Preferably, the general purpose computer includes an 8 megabyte graphics accelerator which will allow for high performance 64-bit graphics for 3D, 2D and DVD picture-quality, full screen video playback. The graphics capability include true color video in any graphics modes and a full frame-rate playback as if one was watching television. This graphics accelerator will further speed the mapping and resolution of images and information to the touch screen monitor. A graphics accelerator that meets the requirements of the invention is manufactured by ATI Technologies Inc.

As mentioned previously, the kiosk 1 preferably includes a sound recording (microphone 17) and broadcasting system (loudspeakers 19) operatively connected to the CPU 11 as part of the means for receiving survey responses and the means for displaying the survey 3, respectively. It will become apparent to a person skilled in the art that the present invention permits not only traditional question-and-answer surveying, but will also easily permit graphic image prompting and sound for survey purposes. The microphone is preferably provided with an auto detect function for recording open-ended responses, as will be hereinafter explained. The system also preferable include two magnetically shielded, dynamic speakers to broadcast sound for full motion video displayed to the respondent.

Preferably, also attached to the CPU 11, is a PCMCIA drive which will be fitted into a 5.25 inch floppy disk drive bay. The drive will have the ability to accept types I, II and III PCMCIA cards. For example, a drive that meets the preferred embodiment of the invention is manufactured by Antec Inc.

Installed in the PCMCIA drive will be a modem 13 which may be hardwired and utilize the analog or digital wireless communications networks. The preferred modem is an 14.4 kbps wireless analog cellular modem which can operate on any standard analog network, although any wireless modem may be used. The purpose of using a wireless modem increases the mobility of the kiosk according to the present invention inasmuch as a separate, dedicated land line is not required. The modem can make and accept calls, in both data and voice mode. It is powered by the CPU, while inserted into a type III PCMCIA drive. For example, a wireless modem that meets the preferred embodiment of the invention is manufactured by Globewave. However, it should be understood that any type of communication network may be used, such as a dedicated land line in the case of a permanently installed kiosk, or radio frequencies other than cellular.

An incentive dispensing device 15 is also connected to the CPU 11. Although the preferred embodiment includes a device that mechanically dispenses pre-printed coupons, a thermal or laser printer may also be used to dispense customized incentives.

The automated survey kiosk will be powered by means of a standard electrical plug attached to a standard electrical outlet. As a power back-up feature, the device may be equipped with an uninterruptible power supply (UPS) battery. The UPS battery will sense any brown-out or black-out conditions and engage itself until power is restored. Before the battery cycles its entire charge, the device will conduct an automatic shut-down of the operating programs. On-site set-up of the device requires no computer or technical expertise. Once the device is plugged in, an automated power-up routine is initiated which will set-up the program and the questionnaire for collecting respondent feedback.

The wireless modem will serve as the primary link between the automated survey kiosk 1 located on-site and an remote off-site computer 100 which will warehouse and transfer coded respondent feedback and reports to the client. The remote central processing unit 100 will also have the capability to run full motion video for the operator to view, and will be compatible with the automated survey kiosk. According to a preferred embodiment, the remote off-site computer will be substantially identical to the kiosk in terms of hardware and software, so that both may communicate adequately. It is important to note that the off-site computer 100 must be equipped with a wireless modem to communicate with the automated survey kiosk 1.

Figure 3:
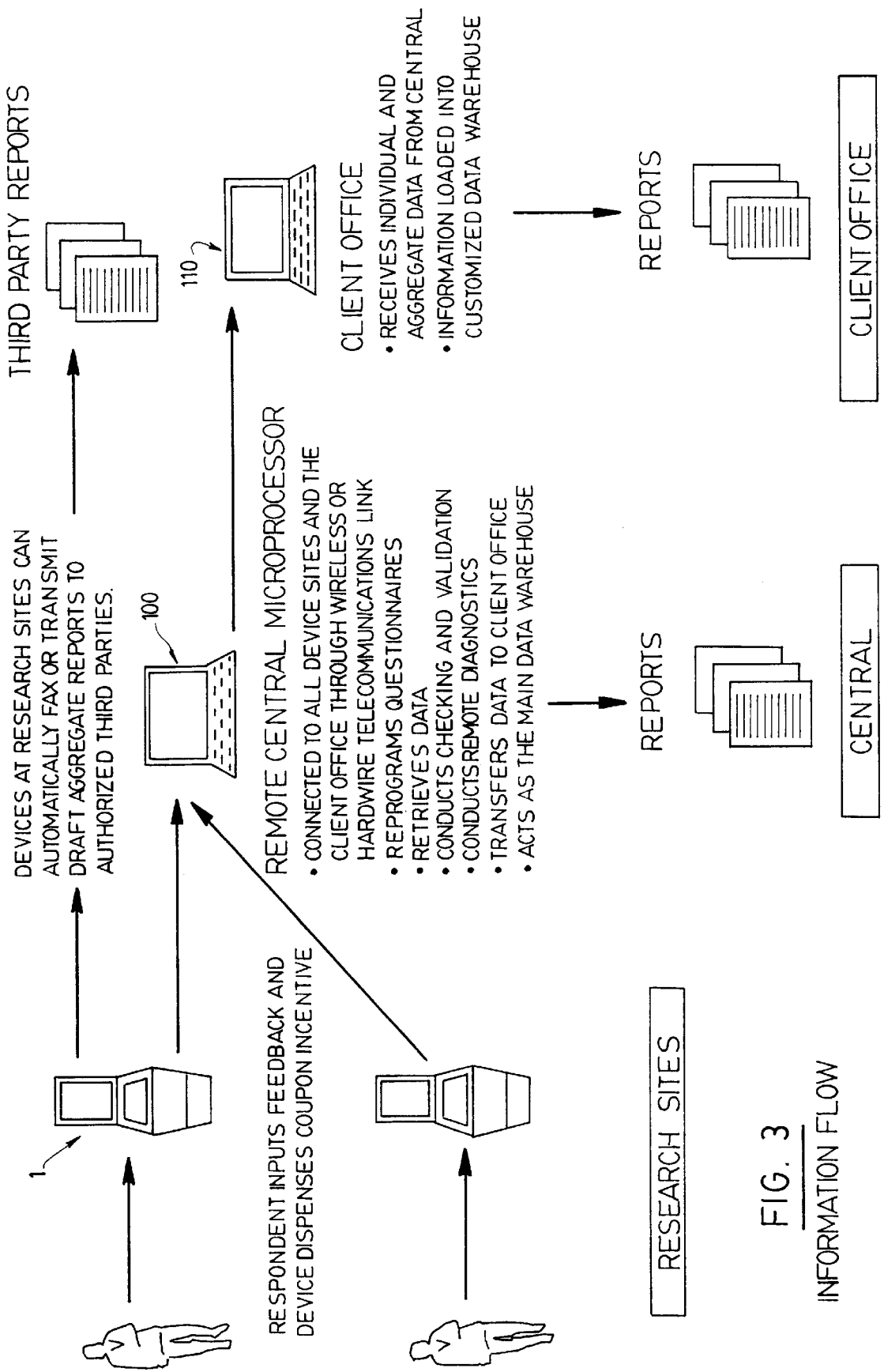
FIG. 3 is a schematic representation of the flow of data between a kiosk, a central remote location and a client.

The modem located in the kiosk is used to transfer information to multiple locations, through either a direct data up-link, the Internet or facsimile, but always through the wireless modem. Therefore, one of the key features of the kiosk is its ability to conduct multiple on-site data gathering initiatives concurrently (see FIG. 3). For applications that involve multiple locations, each kiosk will be assigned a unique identifier which will be attached to all data collected and transferred therefrom.

The data collection and transfer processes is facilitated through a series of integrated software programs that allow for the simultaneous linking of the remote central microprocessor 100 and the kiosks 1. In order to ensure secure communications, encryption algorithms are used to prevent unauthorized access to the data, and unauthorized access to the survey stored in the kiosk. As can be seen from FIG. 3, the kiosk may periodically send draft aggregate reports directly to an authorized third party. Alternatively or concurrently, the kiosk periodically or upon request, sends the raw survey results to the remote off-site microprocessor 100 which performs analysis, conducts remote diagnostics, reprograms the surveys, transfers data to the client offices and essentially acts as the main data warehouse.

To facilitate the data transfer, a communication program is used. For this application the on-site automated survey kiosk will act as the host and the off-site data warehouse will serve at the remote. The remote contacts the host, logs on to the host system and both computers operate in tandem. During this link the remote operator can up/download files, perform all standard computer functions including remote hardware and software diagnostics. It should however be understood that other configurations for communication between the automated survey kiosk and the remote off-site computer can be used.

As mentioned in the Description of the prior art, language barriers, confidentiality concerns and "survey fatigue" have combined to impact the effectiveness of traditional market research approaches. These factors have especially influenced on-site, in-person interviewing. Dissatisfied customers are cynical as to whether negative evaluations conveyed to interviewers will actually be passed on to management. Likewise, many respondents are concerned that their confidential responses could be compromised. In the worst case scenario, minority language customers have no vehicle to even register positive or negative feedback. Add survey fatigue to these drawbacks and the result is a situation where collecting statistically representative research data has become increasingly difficult.

In response to these challenges, a series of devices were developed (see Description of the prior art). These devices were successful in settling confidentiality concerns. The novel use of technology to administer in-person interviews also helped reduce survey fatigue. From a methodological perspective, however, these devices lack flexibility and fail to properly address the challenges of language capability, skip rotations, prompting graphics and collecting open-ended responses. These challenges are solved by the present invention which is a touch screen, multi-media, multi-lingual wireless automated survey kiosk which gathers and transmits on-site feedback from respondents.

When the device is not being used by a respondent, a visual looping section of the program will be engaged to attract respondents to the device. Part of the attract loop may invite respondents to touch the screen, whereupon the attract loop will be broken and the user will be taken to the beginning of the questionnaire.

Referring now to FIGS. 4–8, a graphical software interface is used to prompt a respondent with inquiries and collect data from respondents. This interface has the ability to prompt and administer the questionnaire in multiple languages, conduct skip rotations, display still and moving images as well as collect respondent feedback through the touch screen monitor. This software program will be linked to a program which will warehouse the data and perform statistical tabulations. SPSS, an advanced statistical program used by the market research industry, may be used to perform these functions.

Once into the questionnaire portion of the program, the respondent will be presented with the questions one at a time. Selecting a response will automatically take the user to the next question. All questions will be presented in a text format using a large, easy to read font and may include graphic images. Each of the questions will include a series of answers that will include the text and buttons. The number of buttons appearing on the screen will correspond to the number of possible answers. Respondents will be able to register a response by either touching the relevant button or the relevant answer text (see FIG. 5). Once a selection is made, an alpha-numeric code will be assigned to the answer and the kiosk will initiate the next appropriate question.

As the respondent answers questions a status indicator 120, displayed on the touch screen monitor, will track the respondents progress through the questionnaire (see FIGS. 4–8). For example, once the respondent is half way through the questionnaire, the status indicator will indicate that 50 percent or one-half of the questionnaire has been completed. The status indicator may take the form of a numeric value, pie chart or progress bar. Visually showing the respondent the progress status diminishes the number of mid-interview terminations.

Each time the respondent touches the screen to enter a response a "beep" will be broadcast by means of the speakers (see FIG. 1) to confirm that a selection has been made. Likewise, as soon as the attract loop is broken the date and time of day is recorded by the microprocessor and an interview timer is activated. This will be used to calculate the number of seconds required to complete the interview.

Figure 4:
FIG. 4 is a view of a language selection screen.
Figure 5:
FIG. 5 is a view of a closed-ended question screen.
Figure 6:
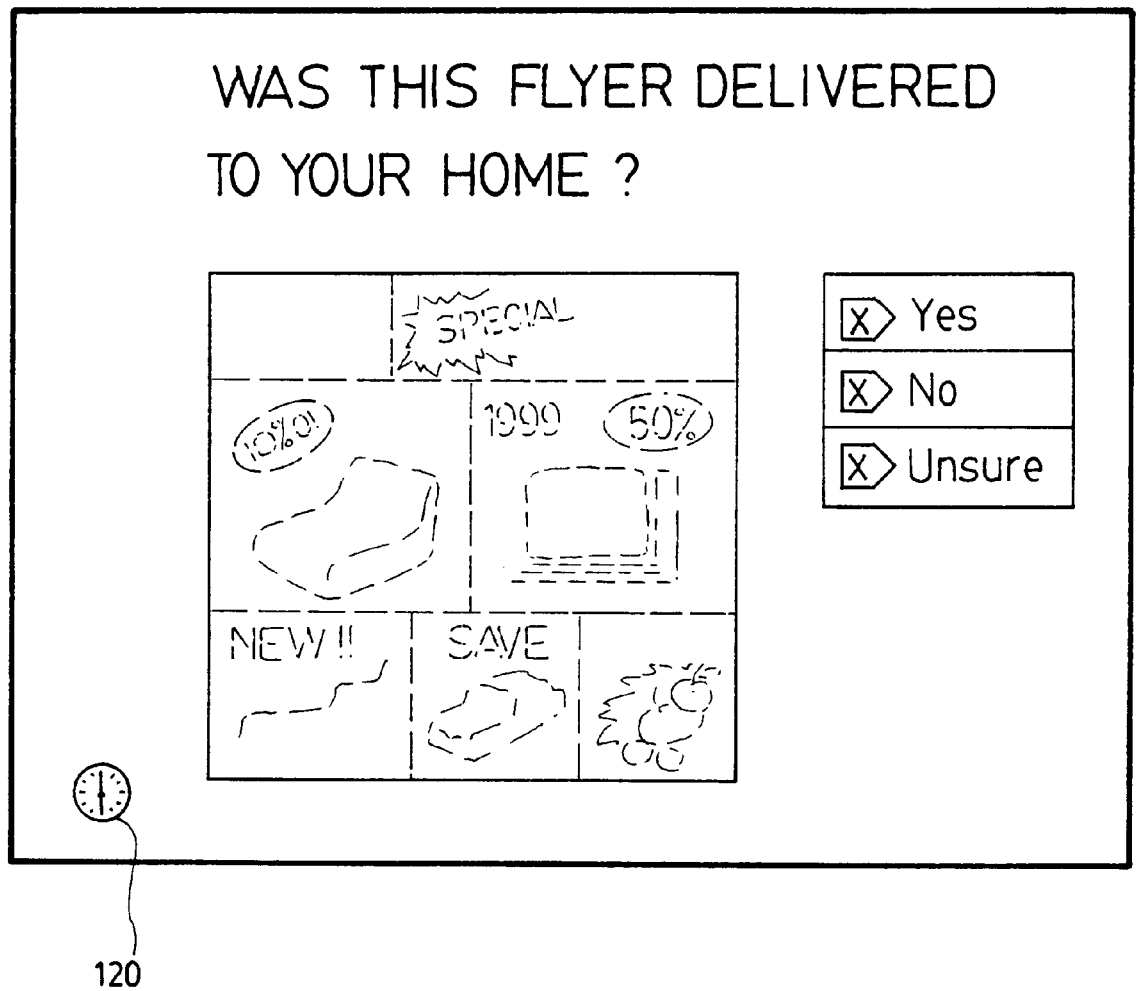
FIG. 6 is a view of a graphics prompting screen.
Figure 7:
FIG. 7 is a view of an open-ended question screen.
Figure 8:
FIG. 8 is a view of an alpha-numeric data capture screen.

After the attract loop is broken the first screen will prompt the respondent to select the preferred language to conduct the interview (see FIG. 4). The screen may use translations of the phrase "continue in. . . . " in each of the respective interview languages to facilitate the language choice selection. Once the language preference is identified by the respondent by touching the appropriate button or text, the device will conduct the complete interview in the language selected.

Fundamentally, there are five types of questions that may be introduced by the device: questions without graphic images; questions with graphic images; questions with open-ended responses; skip-rotation questions; and questions that allow for alpha-numeric inputting.

Standard, closed-ended questions without graphic images, will include the text of the question and a limited selection of answers. For example, the device may be used to demographically profile respondents by asking them to select an answer to a question (see FIG. 7). In this case, respondents will be prompted with a series of fixed selections based on the needs of the research project.

The second type of question initiated by the device will include the ability to visually prompt images ranging from still-life to full-motion video. In this case, the device will introduce the images on the screen as well as a series of potential responses. For example, a common use of graphics involves benchmarking the awareness of print advertising vehicles such as newspaper flyers. In this instance, the image of a specific flyer may be prompted (see FIG. 6) and the respondent may be asked if they remember seeing the specific flyer. Likewise, a full-motion video clip of a television commercial may be played and the respondent may be asked to provide an evaluation.

The third type of question that may be initiated by the device will allow for the respondent to provide an open-ended response. In this case, one of the answer choices may include the option to record a verbal response. These types of questions usually apply to situations where a wide variety of responses may be encountered. For example, a respondent may be asked their motivation for shopping at a particular store (see FIG. 7). In this instance, if the preferred answer is not included in the list of prompted answers, the respondent will have the ability to select "other, record your answer here" and record, in his or her own words, their answer by using the microphone situated above the touch screen monitor (see FIG. 1). Recorded open-ended responses will be linked to the data file through the identification number automatically assigned to the interview.

The fourth type of question that may be initiated by the device is that of a skip rotation. In this instance, questions are rotated in order to minimize bias. For example, if a survey project was being conducted on three products, say products X, Y, and Z, the device would have the ability to rotate the order in which the questions are introduced to the respondent so that any bias is eliminated. The question rotation would be as follows:

Question Order Respondent 1—Product X, Product Y, Product Z

Question Order Respondent 2—Product Y, Product Z, Product X

Question Order Respondent 3—Product Z, Product X, Product Y

Rotation Complete—Begin Skip Rotation Again

Question Order Respondent 4—Product X, Product Y, Product Z

Apart from questions being rotated, answers to a question may also be rotated to minimize any potential bias based on the order in which the answer selections are prompted. The ability to properly administer skip rotations guarantees that the interview will be administered and data collected without bias.

The fifth type of question that may be initiated by the device involves collecting alpha-numeric information. In this case, the respondent may be presented with a virtual keyboard displayed on the touch screen (see FIG. 8). As a selection is made it is displayed on the touch screen. The respondent will also have the ability to edit, by using a "backspace" button, any alpha-numeric responses before selecting the "done" button to confirm the response. For example, if the device was being used in a jurisdiction such as Canada, this capability would be necessary to collect a respondents alpha-numeric postal code (see FIG. 8). This alpha-numeric data capturing capability will also allow the device to collect information on complex product codes, transaction number or unique identifiers.

Immediately following the last question, the respondent will be presented with a thank you screen. The screen will remain displayed for approximately five seconds before the incentive dispensing mechanism is activated and an coupon is issued. Coupons are only issued if all the questions have been answered by the respondent. Once the thank you screen has been displayed and the coupon dispensed, the device will automatically return to the attract loop. At this point the program resets itself in preparation for the next interview.

Before the program resets itself, an identification number may be assigned to the interview. Apart from the answer selections made by the respondent, the program will automatically link the time and date the attract loop was broken as well as the total duration of the interview in seconds to the identification number. All of this information will be initially stored in the CPU and then transferred to the data warehouse in the remote central microprocessor.

Each interview record will be saved in a standard ASCII format. The preferred ASCII format will be comma delineated with a hard return at the end of the record. No blank spaces will be allowed. The following is an example of the type of record which may be used:

"12:15PM,03/15/1998,55,1,2,8,4,5,3,1,M1K1N8"

which includes the date and time the attract loop was broken, the length in time of the interview and the alpha-numeric coded answers of the respondent.

In the case of an incomplete record resulting from a mid-interview termination, questions with answers will be logged normally. The device will automatically pad blanks (questions not answered) with the integer zero ("0"). Incorporating this feature into the device will avoid the requirement for a parsing routine for blank spaces. Likewise, unanswered alpha-numeric responses may be replaced with "XXXXX" to ensure the file is complete. However, other forms of storing the data are well within the purview of a person skilled in this field.

At any time during the research process, even while the respondent is entering responses, data can be transmitted via telecommunications link from the host to any remote location. Although for most projects a daily data report is sufficient, data may be transferred hourly or even in a real-time fashion to the data warehouse in the remote central microprocessor.

Once the information is transferred to the data warehouse in the remote central microprocessor a series of automated data checking and validation procedures are initiated. Any interviews conducted outside of business hours, potentially conducted by employees or other non-qualified respondents, are disqualified from the batch of valid interviews. An algorithm then calculates the reading and completion time for each interview and disqualifies interview sessions where the questions were not likely read. This eliminates instances where a potential respondent randomly made selections as quickly as possible without reading the questions.

Upon completion of the checking and validation procedures, individual interview records and aggregate reports are transferred electronically to the client into a customized data warehouse by the remote central microprocessor via a telecommunications link. Receiving individual data records will allow the client to conduct in-house longitudinal and customized queries on demand. The device will also have the capability to automatically generate and transmit draft aggregate fax reports to identified fax recipients.

Among the key advantages of the device is its remote capability. Surveys can be changed, new languages reprogrammed and revised graphics can be uploaded while the device is still in the field, even if it is being used by a respondent. Likewise, hardware and software diagnostics can also be conducted remotely. This remote capability significantly reduces operational costs on a number of levels. In the case of repairs, remote diagnostics mean on-site technician time can be minimized.

With the ability to remote retrieve data and change the questionnaire the device can be deployed directly to new clients and research projects without returning to head office or requiring an on-site technician visit. If the device is situated in a market with a special cultural group it can be reprogrammed via the telecommunications link with the additional language(s). When on-site access is required, the device can be accessed by means of a password embedded into one of the alpha-numeric questions.

For any research project, a series of devices can be deployed on-site and remote accessed and reprogrammed by the remote central microprocessor. At any given time each on-site device will automatically forward survey feedback. Likewise, each of the surveys can be customized to meet special site needs. For example, many retail clients are interested in profiling the local newspaper and television watching habits of their customers. In this particular instance, each device would be remotely programmed to include questions which prompt on the specific newspaper and television organizations in that market. The result is a significant degree of flexibility, on-site questionnaire customization for micro-markets and reduced costs.

The advantages of having an automated survey kiosk as described are the following: almost instantaneous results for the client, minimal labour, increased flexibility in the types of questions, languages and graphic prompting for customer reaction, ease of installation and ease of reprogramming. Additionally, the kiosk is lightweight, which, combined with the reprogrammability, makes it very versatile in moving and adapting the kiosk to another environment.

Although the present invention has been explained hereinabove by way of a preferred embodiment thereof, it should be pointed out that any modifications to this preferred embodiment within the scope of the appended claims is not deemed to alter or change the nature and scope of the present invention.

What is claimed is:

1. An automated survey kiosk for administering a market survey, said market survey being translated into at least two languages, said market survey including a plurality of inquiries, said kiosk comprising:

a central processing unit including memory means for storing said survey and for controlling the administration of the survey;

means for prompting a user to choose between said at least two languages and for receiving the choice of the user;

a video screen for sequentially displaying each inquiry in the survey in the chosen language in an order which changes from time to time;

means for receiving survey responses;

means for storing the survey responses operatively connected to the means for receiving survey responses; and means for transmitting the survey responses to a remote location whereby, in use, said central processing unit displays each inquiry sequentially on said video screen and prompts a respondent to answer each inquiry by selecting a response from a plurality of responses through said means for receiving the survey responses, said survey responses being stored in said means for storing said survey responses for subsequent transmission to said remote location; and wherein said survey includes at least one inquiry permitting a verbal response, said plurality of responses including a response indicating that the respondent wishes to enter a verbal response, where said means for receiving survey responses further include a microphone and said means for storing survey responses include a voice recorder, whereby, in use, when a respondent selects said response indicating that the respondent wishes to enter a verbal response, said central processing unit indicates to said means for storing a survey response to record a signal coming from said microphone.

2. An automated survey kiosk according to claim 1, wherein said video screen is a touch-screen, whereby said means for receiving survey responses are integrated in said touch screen.

3. An automated survey kiosk according to claim 2, wherein said means for storing the survey responses are integrated in said central processing unit.

4. An automated survey kiosk according to claim 3, wherein said survey kiosk further includes means for dispensing an incentive to said respondent when all of the inquiries in the survey have been answered.

5. A system for gathering market survey responses, said market survey being translated into at least two languages, said system including:

at least one automated survey kiosk, said at least one automated survey kiosk comprising:

a central processing unit including memory means for storing said survey and for controlling the administration of the survey;

means for prompting a user to choose between said at least two languages and for receiving the choice of the user;

a video screen for sequentially displaying each inquiry in the survey in the chosen language in an order which changes from time to time;

means for receiving survey responses;

means for storing the survey responses operatively connected to the means for receiving survey responses; and means for transmitting the survey responses to a remote location;

wireless means located at a central location for remotely sending information to said at least one automated survey kiosk and for receiving said survey responses for processing;

means located at a client's location for remotely receiving, at said predetermined intervals or upon request, said survey responses;

whereby, in use, said central processing unit displays each inquiry sequentially on said video screen and prompts a respondent to answer each inquiry by selecting a response from a plurality of responses through said means for receiving the survey responses, said survey responses being stored in said means for storing said survey responses for subsequent transmission to said remote location; and wherein said survey includes at least one inquiry permitting a verbal response, said plurality of responses including a response indicating that the respondent wishes to enter a verbal response, where said means for receiving survey responses further include a microphone and said means for storing survey responses include a voice recorder, whereby, in use, when a respondent selects said response indicating that the respondent wishes to enter a verbal response, said central processing unit indicates to said means for storing a survey response to record a signal coming from said microphone.

6. An automated survey kiosk according to claim 5, wherein said video screen is a touch-screen, whereby said means for receiving survey responses are integrated in said touch screen.

7. An automated survey kiosk according to claim 6, wherein said means for storing the survey responses are integrated in said central processing unit.

8. An automated survey kiosk according to claim 7, wherein said survey kiosk further includes means for dispensing an incentive to said respondent when all of the inquiries in the survey have been answered.

* * * * *